F. N. ISHAM.
FERTILIZER DISTRIBUTER.
APPLICATION FILED FEB. 29, 1912.
1,055,752.
Patented Mar. 11, 1913.
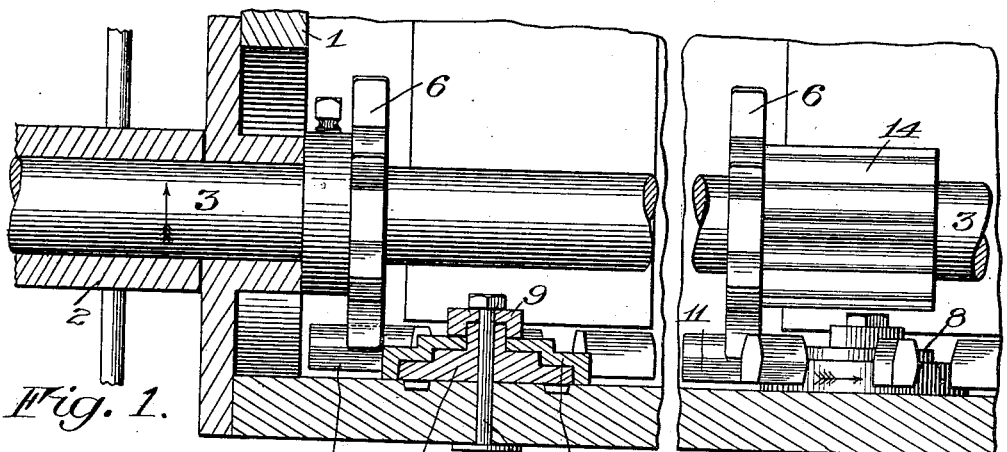
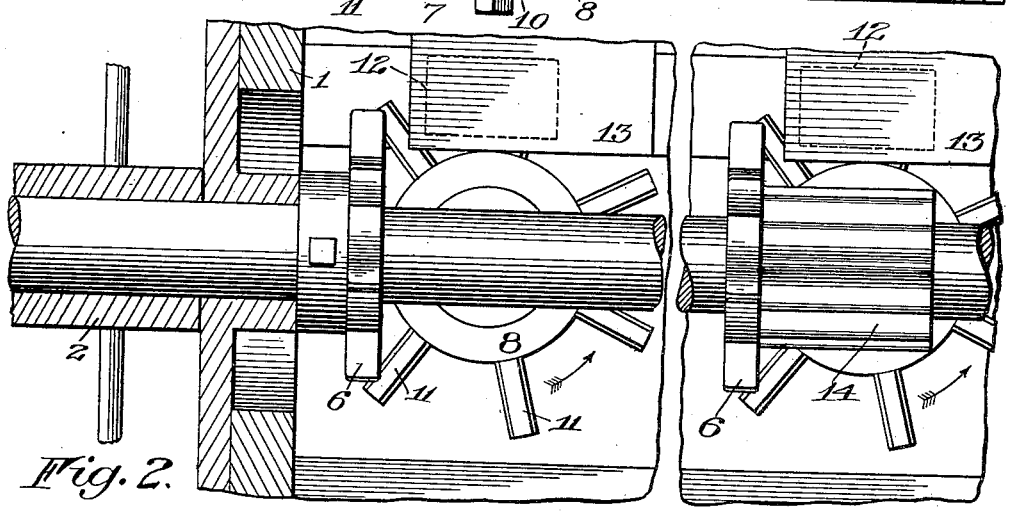
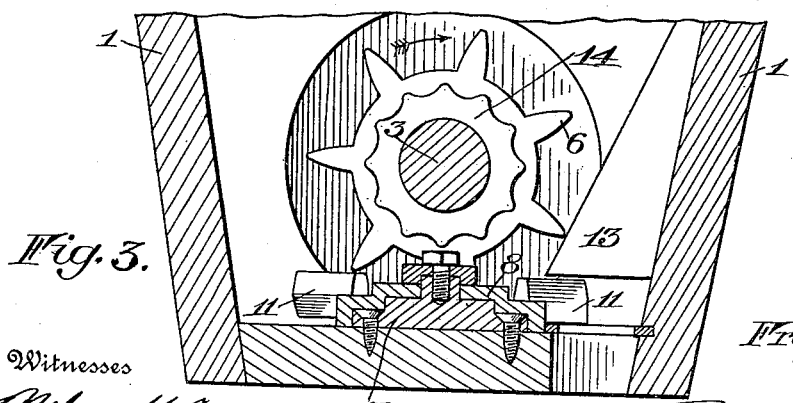
Witnesses
Nelson H. Copep
H. E. Stonebraker
Inventor
Francis N. Isham
By Church & Rich
his Attorneys

UNITED STATES PATENT OFFICE.

FRANCIS N. ISHAM, OF AVON, NEW YORK.

FERTILIZER-DISTRIBUTER.

1,055,752.　　　　Specification of Letters Patent.　　Patented Mar. 11, 1913.

Application filed February 29, 1912. Serial No. 680,720.

*To all whom it may concern:*

Be it known that I, FRANCIS N. ISHAM, of Avon, in the county of Livingston and State of New York, have invented certain new and useful Improvements in Fertilizer-Distributers; and I do hereby declare the following to be a full, clear, and exact description of the same, reference being had to the accompanying drawings, forming a part of the specification, and to the reference-numerals marked thereon.

The present invention relates to fertilizer distributers, being especially adapted for use with grain drills, and other devices for distributing pulverulent material, and it has for its object to provide a simplified construction, which comprises few parts and may be manufactured at comparatively small cost.

A further object of my invention is to provide a construction that will effect a complete agitation and disintegration of the material to be distributed, which frequently becomes clogged unless provision is made for overcoming this in some way.

To these and other ends the invention consists in certain improvements and combinations of parts, all as will be hereinafter more fully described, the novel features being pointed out in the claims at the end of the specification.

In the drawings: Figure 1 is a vertical sectional view through the hopper or receptacle of a fertilizer distributer, constructed in accordance with a preferred form of my invention. Fig. 2 is a horizontal sectional view of the same, and Fig. 3 is a transverse, vertical sectional view taken centrally through one of the feed wheels.

Similar reference numerals throughout the several figures indicate the same parts.

In the present embodiment of my invention, 1 designates the hopper or receptacle for the fertilizing material, as usual in the construction of grain drills, and 2 are the wheels fixed upon the shaft or axle 3. The hopper 1 supports the tongue 4 which is held in position by means of suitable braces 5. The shaft 3 extends longitudinally through the hopper or receptacle 1, and constitutes the operating means for imparting movement to the feed wheels for ejecting the fertilizing material. To this end, in the present embodiment, the shaft 3 carries the gear wheels 6 which are arranged for engagement with the feed wheels, as will now be described. Arranged on the bottom of the receptacle are supports 7 on which the feed wheels 8 are rotatably disposed, the latter having central raised portions, as shown, and being held in position by means of caps or heads 9 and bolts 10. The feed wheels carry suitable teeth or projections 11 which mesh with the teeth of the gear wheels 6, so that as the operating shaft 3 turns, the feed wheels are rotated in the direction of the arrow in Fig. 2, through the instrumentality of the gear wheels 6. In addition to effecting movement of the feed wheels, the gear wheels 6 perform the additional function of agitating the fertilizing material and assisting in breaking up any large portions that may have clogged during the operation.

The apertures through which the material is discharged are designated at 12, being covered by shields or plates 13 beneath which the feed wheels pass, as usual in this type of machine.

In the normal operation of the machine, the material is pushed beneath the shields 13 and dropped through the openings 12, and any large portions that are of too great size to pass beneath the plates are either jammed thereagainst and broken, or else carried around on top of the feed wheel and engaged by one of the gear wheels. To assist further in this breaking up of the material, I may provide suitable enlargements on the operating shaft above the feed wheels, and to this end, in the present embodiment, the shaft 3 carries the corrugated cylindrical sleeves 14 which are preferably arranged adjacent to the gear wheels 6 and immediately above the feed wheels. In this manner, in case any large particles of the fertilizing material are carried around on top of the feed wheel, they are engaged and crushed by the cylindrical portion 14, and can then pass under the shield and be discharged.

In Figs. 1 and 2, I have shown one portion of the operating shaft as provided with the cylindrical corrugated portion, and another portion without said portion, it being understood that this is an advantageous, but not absolutely essential feature of my improvements.

Other changes and departures may be made in the structure herein described without departing from the spirit and scope of my invention, as set forth in the claims hereinafter.

I claim as my invention:

1. The combination with a receptacle, of a series of feed wheels horizontally arranged therein, an operating shaft extending longitudinally through the receptacle and in operative engagement with the feed wheels.

2. The combination with a receptacle, of a series of feed wheels arranged therein, an operating shfat extending through the receptacle, and gear wheels mounted on the operating shaft and engaging the aforementioned feed wheels.

3. The combination with a receptacle, of a series of feed wheels arranged therein, an operating shaft extending through the receptacle and in operative engagement with the feed wheels, and enlargements arranged on the operating shaft at points in vertical alinement with the feed wheels.

4. The combination with a receptacle, of a series of feed wheels arranged therein, an operating shaft extending through the receptacle, gear wheels mounted on the operating shaft and engaging the aforementioned feed wheels, and enlargements arranged on the operating shaft adjacent to the gear wheels at points in vertical alinement with the feed wheels.

5. The combination with a receptacle, of a series of feed wheels arranged therein, an operating shaft extending through the receptacle, gear wheels mounted on the operating shaft and engaging the aforementioned feed wheels, and cylindrical, corrugated enlargements arranged on the operating shaft adjacent to the gear wheels at points in vertical alinement with the feed wheels.

6. The combination with a receptacle, of a series of feed wheels arranged therein, each of said feed wheels carrying a series of radially disposed teeth or projections, an operating shaft extending through the receptacle, and gear wheels mounted on the operating shaft and in operative engagement with said teeth or projections of the feed wheels.

7. The combination with a receptacle, of a series of feed wheels arranged therein, each of said feed wheels carrying a series of radially disposed teeth or projections, an operating shaft extending through the receptacle, gear wheels mounted on the operating shaft and in operative engagement with said teeth or projections on the feed wheels, and cylindrical, corrugated enlargements arranged on the operating shaft adjacent to the gear wheels at points in vertical alinement with the feed wheels.

8. The combination with a receptacle, of a series of feed wheels arranged therein, an operating shaft extending through the receptacle, gear wheels mounted on the operating shaft and engaging the aforementioned feed wheels, and enlargements arranged on the operating shaft adjacent to the gear wheels.

FRANCIS N. ISHAM.

Witnesses:
H. E. STONEBRAKER,
FLORENCE E. FRANCK.

Copies of this patent may be obtained for five cents each, by addressing the "Commissioner of Patents, Washington, D. C."